United States Patent [19]

Busse et al.

[11] 4,427,554

[45] Jan. 24, 1984

[54] METHOD FOR APPLYING A SECONDARY FILTER LAYER OR PRECOAT LAYER IN A PLATE FILTER PRESS, AND PLATE FILTER PRESS FOR PERFORMING THE METHOD

[75] Inventors: Oswald Busse; Hugo Klesper, both of Aarbergen, Fed. Rep. of Germany

[73] Assignee: Passavant-Werke AG & Co. KG, Fed. Rep. of Germany

[21] Appl. No.: 393,025

[22] Filed: Jun. 28, 1982

[30] Foreign Application Priority Data

Jul. 7, 1981 [DE] Fed. Rep. of Germany ....... 3129736

[51] Int. Cl.³ ...................... B01D 25/12; B01D 37/02
[52] U.S. Cl. .................................. 210/777; 210/193; 210/224
[58] Field of Search ................ 210/777, 778, 224–231, 210/193

[56] References Cited

U.S. PATENT DOCUMENTS 1,316,404  9/1919  Wilson ............................. 210/231
3,669,267  6/1972  Hutton ............................. 210/778
4,217,224  8/1980  Fismer et al. ..................... 210/231
4,222,873  9/1980  Parsons ............................ 210/224

Primary Examiner—Ivars C. Cintins
Attorney, Agent, or Firm—Woodford R. Thompson, Jr.

[57] ABSTRACT

To equalize the precoat application over the length of the filter press and/or over the height of each filter cloth, the drainage of at least a part of the carrier medium occurs at at least one, and preferably at a plurality of regularly distributed, drainage points located between the ends of the filter press, and preferably at a throttled rate, so that a pressure is built up in the filter chambers. At least one filter plate, and preferably a plurality of filter plates arranged at regular intervals, is provided with additional drainage orifices for the carrier medium at the upper end thereof with such additional drainage orifices being connected by flexible hoses to one or more filtrate-collecting pipes. The total cross-sectional area of all of these additional drainage orifices is smaller than the total cross-sectional area of the filtrate drainage channels used during filtration.

4 Claims, 3 Drawing Figures

METHOD FOR APPLYING A SECONDARY FILTER LAYER OR PRECOAT LAYER IN A PLATE FILTER PRESS, AND PLATE FILTER PRESS FOR PERFORMING THE METHOD

BACKGROUND OF THE INVENTION

This invention relates to a method and apparatus for applying a secondary filter layer or precoat layer in a plate filter press. As is well known, in order to apply a precoat layer to the filter cloths of a filter press, a suspension of the precoat medium and a carrier medium is fed to one or both ends of the filter press and the carrier medium is drained off.

It is known that in the filtration of sludges in plate-type filter presses the separation of the filter cake from the filter cloth presents difficulties with various types of sludge. For example, these types of filter cakes include filter cakes produced from tailings in the production of coal, filter cakes produced from sludges flocculated with polymeric flocculating agents, and the like. The adhesion of the filter cake to the filter cloth necessitates disagreeable manual labor, which is undesirable and uneconomical.

In order to reduce the adhesion of the cake to the filter cloth sufficiently for the fall of the cake to occur automatically and without residue, it is necessary to apply precoat layers to the filter cloths. Heretofore, this has been done in such a way that, after closing the filter press but before the actual filtration charge, a suspension of a precoat medium or also of a framework-forming secondary filter medium is fed to the chambers of the filter press and the filtrate passing through the filter cloths is drained off, so that the precoat medium is precipitated upon the filter cloths.

However, it has been discovered that, especially with large filter presses, such as with a filter plate of a size ranging from 1.5×1.5 m and having more than 50 filter plates, it is extremely difficult to distribute the precoat layer uniformly over the total filter surface and to ensure that a precoat layer is applied at all regions, particularly in the top regions of the filter cloths. With filter presses of great length, and insufficient application of precoat layer is observed, particularly in their central regions, even though the charging with the precoat suspension is performed from both ends of the filter press.

In such cases, if it is attempted to continue the feeding of the precoat suspension until a sufficient precoat layer has been deposited in the central part of the filter press, and in the top regions of the filter cloths, then a very large quantity of liquid and a very long time is required to deposit the precoat layer. Also, during this time a thicker precoat layer than is necessary to eliminate the filter cake adhesion will have been deposited in the bottom regions of the filter cloths and particularly in the end sections of the filter press. The consumption of precoat is therefore unnecessarily high, and the filter resistance of the filter cloths thus coated too thickly with precoat is increased unnecessarily.

SUMMARY OF THE INVENTION

The main object of our invention is to provide a method and the apparatus needed for its performance, whereby even in large filter presses a highly uniform application of a precoat layer or a secondary filter layer is possible over the entire length and height of the filter press in a short time and with the lowest possible consumption of suspension.

The manner of achieving the object of our invention, and other advantages are achieved by providing at least one, and preferably a plurality of, uniformly distributed filtrate drainage passageways at points remote from the ends of the filter press. The carrier medium for the precoat suspension is thus advantageously prevented from flowing predominantly by a short-circuit path only through the outer chambers of the filter press to coat their filter cloths, whereby insufficient carrier medium flows through the filter chambers located closer to the center and air remains in these chambers. With our invention, on the other hand, the additional filtrate drainage points cause a substantial portion of the precoat suspension to be forced to make its way through the filter chambers located in the center, so that no air can remain therein, thus preventing a preferential coating of the filter cloths only in the outer filter chambers.

Due to the improved dimensioning of the additional filtrate drainage passageways so that their aggregate cross-sectional area is smaller than the feed cross-sectional area, a build-up of pressure in the filter chambers is effected, whereby a particularly uniform distribution of the precoat layer on the filter cloths is achieved, as actual experiments have shown.

The additional filtrate drainage orifices provided in accordance with our invention may be provided on each filter plate, however experiments have shown that it is sufficient if only every third or even only every tenth filter plate is provided with such an additional filtrate drainage orifice.

DESCRIPTION OF THE DRAWING

One embodiment of our invention is explained more fully hereinafter with reference to the drawings, in which.

DETAILED DESCRIPTION

Figure 1:
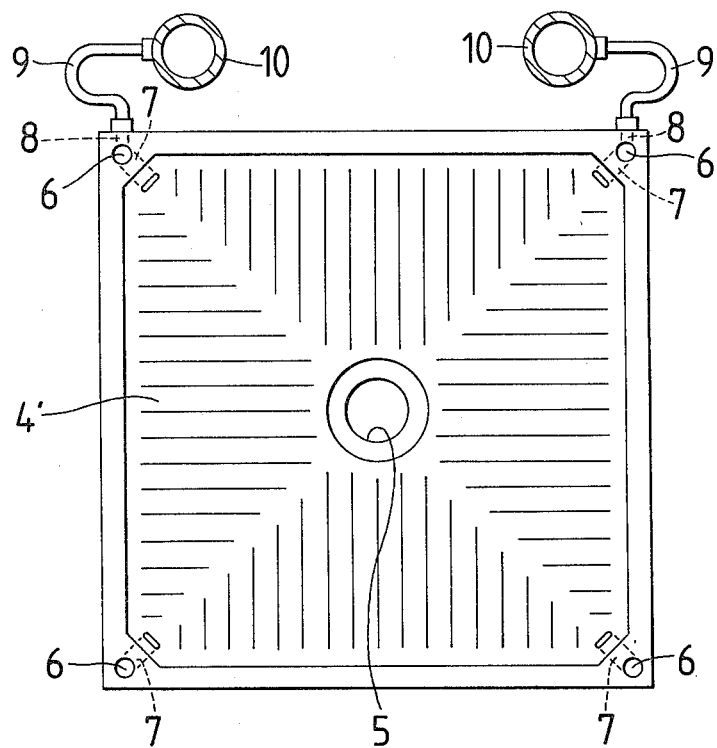
FIGS. 1 and 2 show schematically in elevation and in longitudinal section respectively a filter plate for a plate filter press constructed in accordance with one embodiment of our invention.
Figure 2:
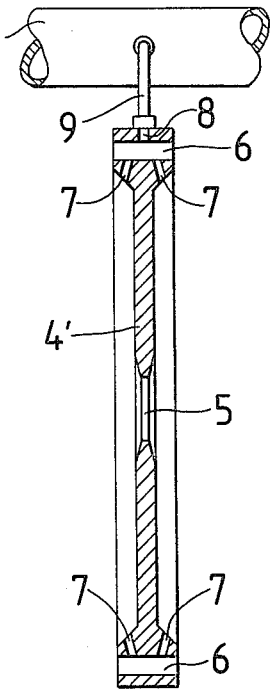
Figure 3:
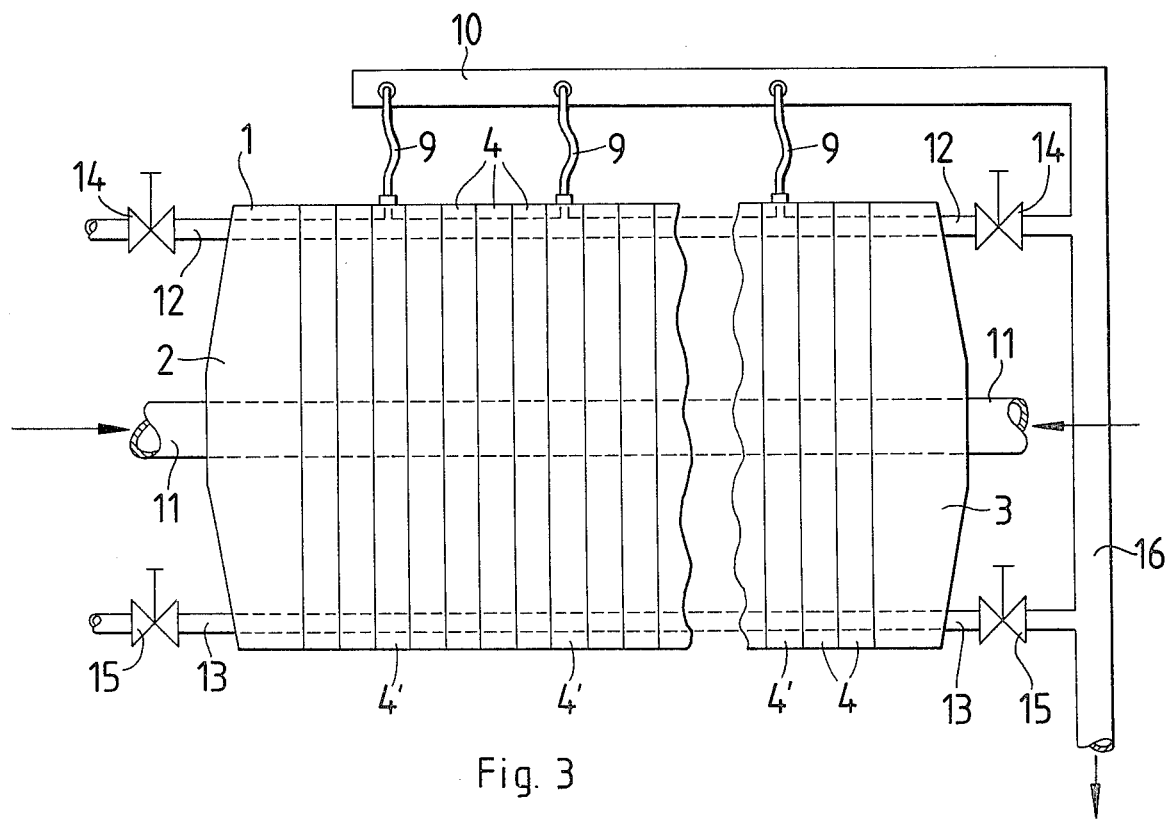
FIG. 3 is a schematic view showing in side elevation a part of the plate filter press constructed in accordance with our invention.

The plate filter press 1 shown in FIG. 3 embodies two end members 2 and 3 and a plurality of filter plates 4 and 4' arranged between them. As shown in FIGS. 1 and 2, each filter plate 4' is provided with a central bore 5 and bores 6 arranged through the corners thereof which communicate with filtrate channels 7. An additional filtrate drainage orifice 8 branches from each of the bores 6 in the upper corners of each filter plate 4' and is connected by a flexible hose 9 to a filtrate collecting pipe 10. Mounted in the filter press between the filter plates 4', having the construction shown in FIGS. 1 and 2, are a plurality of the filter plates 4 which have only the central bore 5 and the bores 6 at the corners thereof. That is, the filter plates 4 have no additional filtrate drainage orifices 8 which communicate with hose lines 9, as is the case with the filter plates 4'.

When the filter press is closed, the mutually aligned central orifices or bores 5 form the feed channel through which the suspension to be filtered is fed from both ends of the filter press through feed pipes 11, by suitable means such as pumps. Along this same path a suspension containing precoat medium or secondary filter medium is fed before each filtration charge. The bores 6 through the corners of the filter plates are aligned with each other to form continuous filtrate drainage channels which communicate with upper and lower drainage pipes 12 and 13, respectively. Control valves 14 and 15 are also provided in the drainage pipes 12 and 13 at both ends of the filter press, as shown. The filtrate is thus drained off along this path during the filtration. All of the drainage pipes 12 and 13 and the filtrate collecting pipes 10 connected to the additional filtrate drainage orifices 8 of the filter plates 4' are connected to a common outlet 16 as shown in FIG. 3.

When it is desired, before actual filtration takes place, to apply a precoat layer to the filter cloths (not shown) with which the filter plates are covered, the control valves 14 and 15 are closed. A suspension of the precoat layer is then fed through the feed pipes 11 to gradually fill the chambers of the filter press while the air can escape through the drainage orifices 8, hose lines 9 and collecting pipes 10. Since the carrier medium of this precoat suspension cannot escape through the normal filtrate drainage pipes 12 and 13, because the control valves 14 and 15 are closed, it is drained off through the hose lines 9 and collecting pipes 10. That is, a uniform distribution of the precoat layer over the length of the filter press is obtained only when the chambers of the filter press are substantially completely filled. The cross sectional area of all the additional filtrate drainage orifices 8 is jointly smaller than the passage cross-sectional area of the inlet or feed channels and is also smaller than the aggregate cross-sectional area of the normal filtrate drainage pipes 12 and 13, which are closed by the control valves 14 and 15 during precoating. This procedure assures a build-up of a slight positive pressure in the chambers of the filter press during the precoat application. It is also possible, during the last phase of application of the precoat layer, to open the control valve 14 of the upper filtrate drainage pipes 12 slightly and drain off filtrate here additionally at a throttled rate. However, it must still be ensured that the aggregate quantity of filtrate drained off through the pipes 12 and the hose lines 9 is smaller than the quantity of suspension fed per unit of time.

It is also advantageous if pure water or filtrate is fed to the filter press before feeding the precoat suspension in order to fill the chambers of the filter press in advance. This filling is then displaced by the precoat suspension as it is fed into the filter press.

What we claim is:

1. The method for applying a secondary filter layer or precoat layer to the filter cloths of a plate filter press by feeding a suspension comprising a carrier medium containing a secondary filter medium or precoat medium from one or both ends of the filter press into the chambers of the filter press and draining the carrier medium passing through the filter cloths out of the filter press, the improvement comprising, draining at least a part of the carrier medium out of the filter press at a plurality of drainage points distributed along the length of the filter press, and throttling the drainage of the carrier medium to build up pressure in the filter chamber.

2. The method as defined in claim 1 in which at least at the start of the application of the secondary filter layer or precoat layer the carrier medium is drained out of the filter press exclusively through the drainage points located between the ends of the filter press.

3. The method as defined in claim 1 in which the carrier medium is also drained out of the filter press through continuous filtrate drainage channels at the ends of the filter press with the total cross sectional area of said drainage channels being smaller than the cross sectional area of the means feeding said suspension.

4. The method as defined in claim 1 in which the chambers of the filter press are totally or partially filled with liquid before the feeding of the suspension of the secondary filter medium or precoat medium.

* * * * *